June 9, 1959  J. CAUTHON  2,890,058
RACK FOR GROCERY CARTS
Filed Sept. 2, 1955  2 Sheets-Sheet 1

INVENTOR.
Jack Cauthon
BY Herman Seid
Atty.

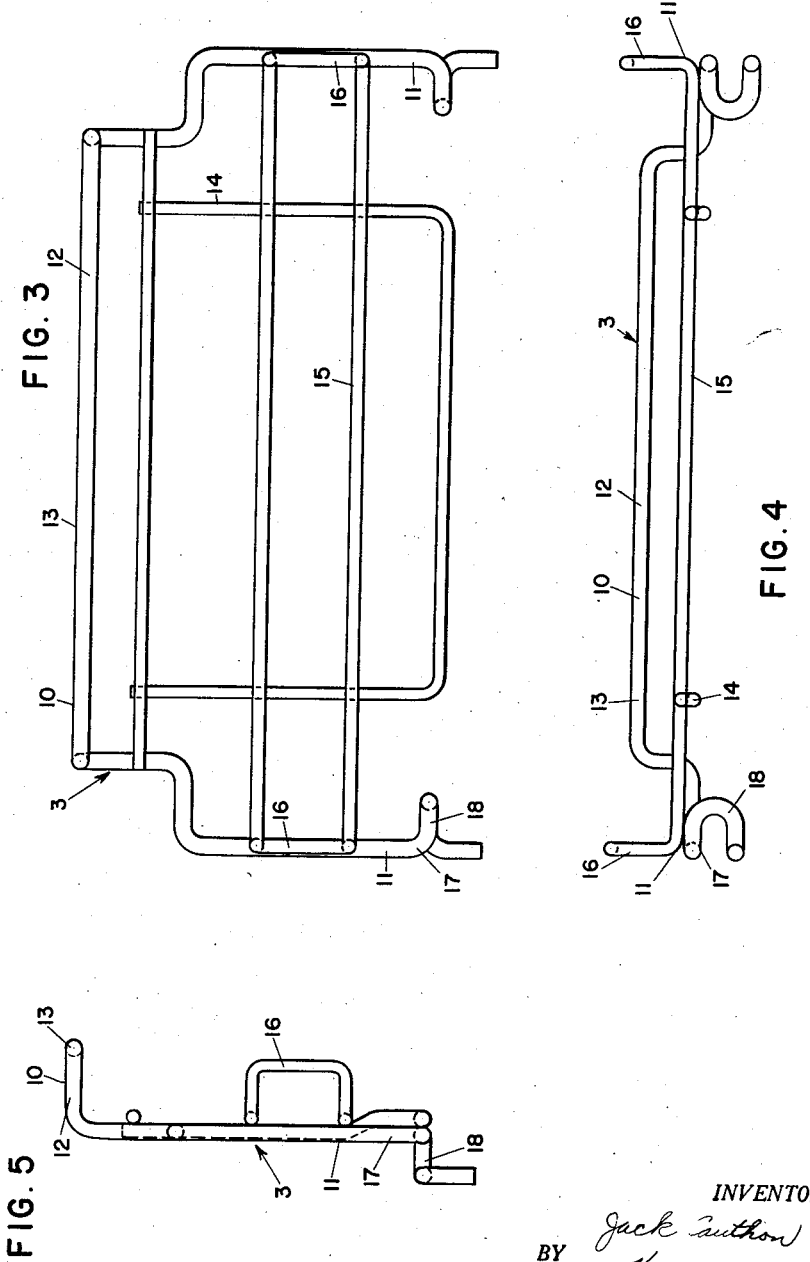

2,890,058

RACK FOR GROCERY CARTS

Jack Cauthon, Jackson, Mich., assignor, by mesne assignments, to Tote-Cart Company, Chicago, Ill., a partnership Application September 2, 1955, Serial No. 532,195

6 Claims. (Cl. 280—33.99)

This invention relates to grocery carts and, more particularly, to a rack adapted to be slidably attached to a grocery cart to provide an extended shelf to receive cartons and the like.

It is difficult, particularly for feminine users, to remove a heavy carton of bottled or canned goods from the basket of a grocery cart for the carton must be raised almost arm-pit high to lift it up and over the top of the basket. If the heavy carton is placed in the lower shelf or basket of the cart, there is difficulty in removing the carton since the space is tight under the upper basket and it is necessary to stoop very low to try to remove the carton. It is desirable to supply some means which would obviate the necessity of lifting the carton so high or getting down on one's hands and knees to remove the carton from the lower shelf.

The chief object of the present invention is to provide means which may be attached to a grocery cart to provide additional storage space for cartons and the like which obviate the need for lifting the carton up and over the top of the basket or getting down on one's hands and knees to remove the carton from the lower shelf of the basket.

An object of the present invention is to provide a rack for a grocery cart which may be easily removed from the cart and which may be slidably attached to the cart to provide an extension when desired forming additional storage space for cartons and the like.

A further object is to provide a rack for a grocery cart adapted to be slidably attached to the cart by hook members which permit movement of the rack longitudinally of the cart to provide an extended shelf for additional storage space to receive cartons and the like. Other objects of the invention will be readily perceived from the following description.

This invention relates to the combination with a grocery cart having a storage basket and a storage shelf of a rack adapted to be attached to the shelf to form an extension thereof thus providing additional storage space for cartons and the like. The rack terminates in hook members which fit about the frame member of the shelf permitting slidable movement of the rack longitudinally of the cart and permitting the rack to extend rearwardly beyond the shelf to provide additional storage space adapted to receive cartons, etc.

The attached drawings illustrate a preferred embodiment of the invention, in which:

Figure 3 is a plan view of the rack;

Figure 4 is a view in side elevation of the rack; and

Figure 5 is a view in end elevation of the rack.

Figure 1:
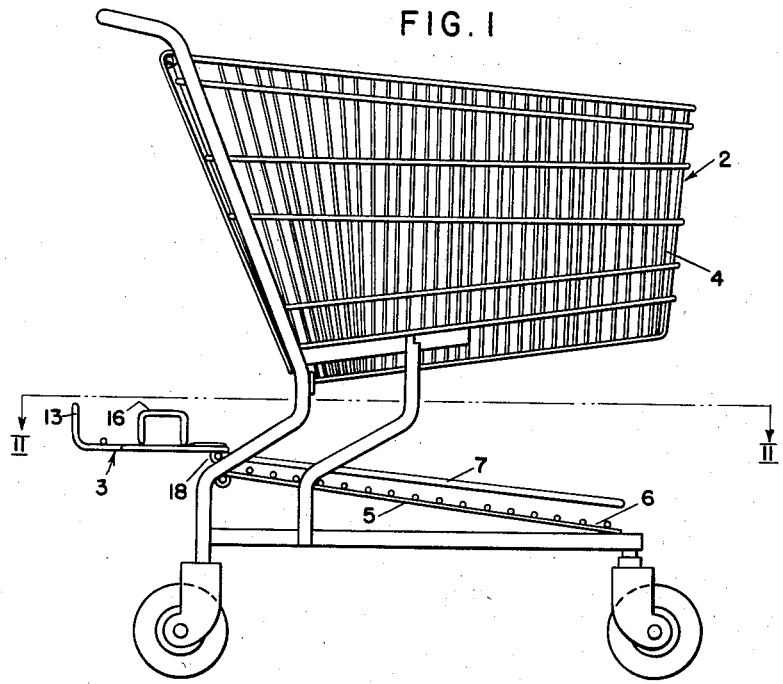
Figure 1 is a view in elevation of a grocery cart provided with the rack of the present invention.
Figure 2:
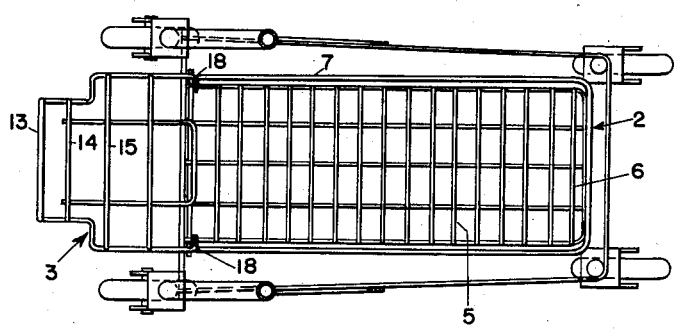
Figure 2 is a plan view taken on the line II—II of Figure 1 illustrating the rack in extended position.

Referring to the drawings, there is shown a grocery cart 2 provided with the rack 3 of the present invention. The grocery cart 2 includes the usual storage basket 4 mounted on a wheeled framework and a storage shelf 5 placed below the basket. Shelf 5 includes a base member 6 supported on the framework of the cart and a frame or rail 7 in the form of a bar extending about the base and spaced therefrom and also supported from the framework of the cart. Frame 7 serves to prevent articles stored on base 6 from falling therefrom. If desired, the car 2 may be provided with a child's seat as disclosed, for example, in copending application Serial No. 520,863, filed July 8, 1955.

Rack 3 comprises a frame member 10 forming the sides 11 and the rear end 12 of the rack. Preferably, the side portions 11 are in the same horizontal plane while the rear end 12 is turned upwardly to form a flange 13 extending in a plane other than the plane of the side portions 11. Flange 13 so formed prevents articles falling from the rear end of the rack. The rack includes a base 14 attached to the frame, base 14 being formed preferably of a plurality of wires as shown.

Bars 15 extend across the base 14 from the side portions 11 and are attached to the base and the side portions. The terminal portions 16 of bars 15 are turned upwardly adjacent the side portions to form flanges which prevent articles stored on the rack from falling sidewards from the rack.

The terminal portions 17 of the frame are bent inwardly, downwardly, outwardly, and longitudinally of the frame to form hook members 18 which fit over the side portions of frame 7. In other words, the bent portions of the frame form sockets which receive the side portions of frame 7 to attach the rack to the shelf.

In attaching the rack 3 to shelf 5, a hook member 18 is fitted over one side portion of frame 7, the socket formed by the bent sections of terminal portion 17 receiving the side portion of frame 7. The rack is then moved forward on the shelf and twisted at an angle to slip the other hook member 18 on the other side portion of frame 7 securely attaching the frame to the shelf. It will be observed that the rack is then slidable along the side portions of frame 7. When the rack slides rearwardly it forms in effect an extension of shelf 5 to receive cartons, etc. When the rack is slid to its rearward position it will be observed that the rear end of frame 7 serves as a stop to prevent further rearward movement of the rack. The rack may be easily retracted to rest over the shelf proper when it is not in use if desired.

While I have described a sliding rack it will be understood that the rack may be mounted to the cart in other ways if desired. For example, the rack may be hingedly connected to the shelf if desired and swung upwardly in a clockwise direction when it is not in use.

The present invention provides simple and inexpensive means which may be attached to a grocery cart to provide additional storage space for cartons and the like thus obviating the necessity of lifting the carton up and over the top of the basket or getting down on one's hands and knees to remove a carton from the lower shelf. Preferably, such means comprise a rack slidably connected to the cart so that it may be placed over the shelf when not in use although it may be hingedly connected if desired in order that it may be swung out of the way when not in use. A grocery cart provided with the rack of the present invention has enhanced storage space without interference with nesting of carts during storage. The slidable rack provides an extension for the shelf furnishing storage space for small cartons, etc., which is readily accessible to the user and which prevents stored articles from falling during movement of the cart.

While I have described a preferred embodiment of my invention, it will be understood my invention is not limited thereto since it may be otherwise embodied within the scope of the following claims.

I claim:

1. A nestable grocery cart, comprising a wheeled framework; a tapered basket mounted near the top of the framework; a substantially flat forwardly inclined shelf mounted near the bottom of the framework, said shelf having side rails rigidly attached to the framework and being positioned above the plane of the shelf; and a rack slidably mounted on said rails and including a flat substantially rectangular base, the sides of the base extending forwardly of the base and terminating in hook members adapted to reach around and slidably engage the said rails of the shelf to permit the rack to be pushed under the frame of the cart when the cart is nested and to be pulled rearwardly of the cart when the cart is unnested so as to provide a rearward extension of the shelf.

2. The cart of claim 1 in which the rack is provided with upstanding side and rear walls.

3. The cart of claim 2 wherein the hook members are formed by turning the end portions of the rack sides inwardly, downwardly and outwardly to form U-shaped outwardly extending sockets.

4. In combination with a grocery cart having a storage basket and a storage shelf placed below the basket, the shelf including a base member and bar means extending about the base and spaced therefrom to prevent supported articles falling from the base, a rack terminating in hook members fitting about the bar means to attach the rack to the shelf to form an extension thereof providing additional storage space for cartons and the like, said rack being removable and slidable longitudinally of the bar means to provide the extension.

5. The combination according to claim 4 in which the bar means extends about the four sides of the base, the rear portion of the bar means serving as a stop to prevent further rearward movement of the rack.

6. In combination with a grocery cart having a storage basket and a storage shelf placed below the basket, the shelf including a base member and bar means extending about the base and spaced therefrom to prevent supported articles falling from the base, a rack terminating in hook members fitting about the bar means to attach the rack to the shelf to form an extension thereof thereby providing additional storage space for cartons and the like, said rack comprising a frame member forming two sides and the rear of the rack, side portions of the frame being in substantially the same plane, the rear portion being turned upwardly to form a flange to prevent articles falling from the rack, terminal portions of the frame forming the hooks to secure the rack to a grocery cart, a base portion attached to the frame, and bar means attached to the base portion and to the side portions of the frame, portions of the bar means adjacent the side portions being turned upwardly to form flanges to prevent articles falling from the rack.

References Cited in the file of this patent

UNITED STATES PATENTS

| | | |
|---|---|---|
| 1,191,198 | Kuhn et al. | July 18, 1916 |
| 2,033,792 | Sywert et al. | Mar. 10, 1936 |
| 2,466,360 | Bitney | Apr. 5, 1949 |
| 2,583,514 | Maslow | Jan. 22, 1952 |
| 2,615,726 | Brottman | Oct. 28, 1952 |
| 2,662,775 | Goldman | Dec. 15, 1953 |